(12) United States Patent  
Matsuoka

(10) Patent No.: US 7,566,376 B2  
(45) Date of Patent: Jul. 28, 2009

(54) PRESSURE CONTAINER MANUFACTURING METHOD

(75) Inventor: Seiichi Matsuoka, Tokyo (JP)

(73) Assignee: Fuji Jukogyo Kabushiki Kaisha (JP)

( * ) Notice: Subject to any disclaimer, the term of this patent is extended or adjusted under 35 U.S.C. 154(b) by 791 days.

(21) Appl. No.: 10/954,769

(22) Filed: Sep. 30, 2004

(65) Prior Publication Data

US 2005/0077643 A1    Apr. 14, 2005

(30) Foreign Application Priority Data

Oct. 1, 2003    (JP)    ............................ 2003-342937  
Oct. 3, 2003    (JP)    ............................ 2003-346156

(51) Int. Cl.
| | |
|---|---|
| F17C 1/06 | (2006.01) |
| B29C 70/16 | (2006.01) |
| B65H 81/00 | (2006.01) |
| B65H 77/00 | (2006.01) |

(52) U.S. Cl. ........................ 156/149; 156/148; 156/172; 264/136; 264/258

(58) Field of Classification Search ................ 264/136, 264/103, 236, 258, 512, 573; 156/148–149, 156/172, 393; 220/4.12, 589–590, 562, 581, 220/592, 62.15; 427/372.2

See application file for complete search history.

(56) References Cited

U.S. PATENT DOCUMENTS

| | | | | |
|---|---|---|---|---|
| 3,100,171 A | * | 8/1963 | Hardesty | ..................... 156/165 |
| 3,115,271 A | * | 12/1963 | Anderson et al. | ........... 343/872 |
| 3,276,936 A | | 10/1966 | Uhlig | |
| 3,282,757 A | * | 11/1966 | Brussee | ........................ 156/69 |
| 3,331,722 A | * | 7/1967 | Ponemon | ..................... 156/425 |
| 3,969,812 A | * | 7/1976 | Beck | .......................... 29/421.1 |
| 4,410,385 A | | 10/1983 | Murphy et al. | |
| 4,603,084 A | * | 7/1986 | Drachenberg et al. | ........ 428/377 |
| 4,699,288 A | * | 10/1987 | Mohan | ........................ 220/590 |
| 4,767,017 A | * | 8/1988 | Logullo et al. | ............... 220/590 |
| 5,388,497 A | * | 2/1995 | Akiyama et al. | ................ 87/34 |
| 5,435,867 A | * | 7/1995 | Wolfe et al. | ................... 156/171 |
| 5,476,027 A | * | 12/1995 | Uchida et al. | .................... 87/29 |
| 5,590,803 A | * | 1/1997 | Kaempen | ................ 220/560.03 |
| 5,742,992 A | * | 4/1998 | Kaempen | .................... 29/455.1 |
| 5,763,027 A | * | 6/1998 | Enders et al. | ............... 428/34.7 |
| 6,047,756 A | * | 4/2000 | Uchida | ........................ 156/393 |

(Continued)

FOREIGN PATENT DOCUMENTS

CA    2525171 A1 *    5/2006

(Continued)

*Primary Examiner*—José A Fortuna  
(74) *Attorney, Agent, or Firm*—Smith, Gambrell & Russell

(57) ABSTRACT

A pressure container manufacturing method for manufacturing a pressure container by forming an outer shell made of a fiber reinforced composite material on a periphery of a liner, by: preparing a first fiber bundle which has a large diameter fiber bundle unimpregnated with a resin, and a second fiber bundle which has a small diameter fiber bundle and a thermoplastic resin covering the small diameter fiber bundle; forming a body on the periphery of the liner by braiding the first fiber bundle and the second fiber bundle with a braider; impregnating the first fiber bundle with the thermoplastic resin in the second fiber bundle which is heated and melted; and curing the thermoplastic resin to form the outer shell, wherein tension applied to the first fiber bundle is larger than tension applied to the second fiber bundle when forming the body and/or impregnating the thermoplastic resin.

7 Claims, 8 Drawing Sheets

U.S. PATENT DOCUMENTS

| | | | |
|---|---|---|---|
| 6,190,481 B1 * | 2/2001 | Iida et al. | 156/175 |
| 6,953,129 B2 * | 10/2005 | DeLay | 220/589 |
| 7,204,903 B2 * | 4/2007 | Yasui | 156/149 |
| 2004/0040969 A1 * | 3/2004 | DeLay et al. | 220/586 |
| 2004/0052997 A1 * | 3/2004 | Santo | 428/36.3 |
| 2005/0076995 A1 * | 4/2005 | Yasui | 156/148 |
| 2005/0077643 A1 * | 4/2005 | Matsuoka | 264/103 |
| 2005/0258575 A1 * | 11/2005 | Kruse et al. | 264/512 |
| 2005/0260372 A1 * | 11/2005 | Matsuoka et al. | 428/35.7 |
| 2006/0054628 A1 * | 3/2006 | Matsuoka et al. | 220/581 |
| 2006/0257576 A1 * | 11/2006 | Santo | 427/372.2 |
| 2007/0246461 A1 * | 10/2007 | Shimada et al. | 220/4.12 |

FOREIGN PATENT DOCUMENTS

| | | | |
|---|---|---|---|
| EP | 0 033 244 A2 | | 8/1981 |
| EP | 0 897 791 A2 | | 2/1999 |
| EP | 1520683 A2 | * | 4/2005 |
| EP | 1526324 A2 | * | 4/2005 |
| JP | 7-256771 | | 10/1995 |
| JP | 2004066637 A | * | 3/2004 |
| JP | 2004148777 A | * | 5/2004 |
| JP | 2005106227 A | * | 4/2005 |
| JP | 2005113963 A | * | 4/2005 |
| JP | 2006062320 A | * | 3/2006 |
| JP | 2006082276 A | * | 3/2006 |
| JP | 2006132746 A | * | 5/2006 |
| JP | 2007154927 A | * | 6/2007 |
| WO | WO 95/22030 A | | 8/1995 |
| WO | WO 2006112252 A1 | * | 10/2006 |
| WO | WO 2007086336 A1 | * | 8/2007 |

* cited by examiner $D_1 = D_2$ $D_1 : d_2 = 12:1$

PRESSURE CONTAINER MANUFACTURING METHOD

BACKGROUND OF THE INVENTION

1. Field of the Invention

The present invention relates to a pressure container manufacturing method and particularly, to a pressure container manufacturing method for manufacturing a pressure container which is reinforced by covering a liner with a fiber reinforced composite material.

2. Description of the Related Art

Currently, a pressure container for storing and transporting compressed gas such as CNG (Compressed Natural Gas), CHG (Compressed Hydrogen Gas) or the like, or low temperature gas has been in practical use. Earlier, a pressure container made of metal which has high strength and is excellent in gas barrier property has been mainstream, however due to its heavy weight, there is a difficulty in applying it to a fuel tank of an automobile or a space plane in which weight saving is required. Therefore, recently, there has been proposed a relatively light weight FRP (Fiber Reinforced Plastics) wrapped pressure container which is made by forming an FRP layer on the periphery of a hollow cylindrical liner.

There are a FW (Filament Winding) method and a TW (ape Winding) method as a method to form the FRP layer on the periphery of the hollow cylindrical liner. The FW method is a method in which fiber bundles are impregnated with resin beforehand to prepare a tow shaped prepreg and an FRP layer is formed by winding the tow shaped prepreg on the liner, or a method in which fiber bundles which are fed in a predetermined direction are impregnated with resin to be wound around a liner. The TW method is a method in which a tape shaped prepreg is wound around the liner to form an FRP layer. Applying the FW method or the TW method is successful in obtaining an FRP wrapped pressure container which is relatively light in weight and has high strength.

However, applying the FW method or the TW method would raise a problem of requiring a long period of time to wind the tow shaped or tape shaped continuous prepreg on the liner. For example, it will take about 8 hours to manufacture a CNG tank (400 mm in diameter, and 1000 mm in length) for 200 atmospheres of CNG which is installed in a vehicle.

To solve this problem, recently, there has been proposed a "braiding method" in which a braider is used to form a body on the periphery of the liner by braiding a plurality of fiber bundles, and the body is impregnated with resin to be cured to form the FRB layer (for example, refer to JP-Tokukaihei-11-58540A (Page 3, FIG. 4) or JP-Tokukaihei-7-256771A (Page 2, FIG. 2)). Applying the braiding method is successful in shortening the manufacturing time and reducing the manufacturing cost of the pressure container compared with the case of applying the FW method or the TW method.

In the earlier developed "braiding method", fiber bundles which are not impregnated with resin such as a dry CF (Carbon Fiber) or the like are often used to reduce the resistance while braiding. However, since the bundle which is not impregnated with resin does not have adhesiveness like the prepreg, the fiber bundles may loosen while braiding. Such looseness of the fiber bundles would be a main cause of reducing the strength of the FRP layer. Also, in the earlier developed "braiding method", a plurality of fiber bundles is crossed, so that the fiber bundles are bent at crossing portions, thereby loosening the bundles. Increasing the amount of the fiber bundles for keeping the strength of the FRP layer would raise problems of increasing the weight of the pressure container and raising the manufacturing cost.

SUMMARY OF THE INVENTION

The present invention is developed in view of the above described problems, and an object of the present invention is to provide a pressure container manufacturing method in which a pressure container which has high strength and is light in weight can be obtained while suppressing the manufacturing cost and shortening the manufacturing time.

For solving the problems, in accordance with a first aspect of the present invention, the pressure container manufacturing method for manufacturing a pressure container by forming an outer shell made of a fiber reinforced composite material on a periphery of a line, comprises:

preparing a first fiber bundle which comprises a large diameter fiber bundle unimpregnated with a resin, and a second fiber bundle which comprises a small diameter fiber bundle and a thermoplastic resin covering the small fiber bundle;

forming a body on the periphery of the liner by braiding the first fiber bundle and the second fiber bundle with a braider;

impregnating the first fiber bundle with the thermoplastic resin in the second fiber bundle which is heated and melted; and curing the thermoplastic resin to form the outer shell, wherein a tension applied to the first fiber bundle is larger than a tension applied to the second fiber bundle when forming the body and/or impregnating the thermoplastic resin.

According to the method of the first aspect of the present invention, the body is formed on the periphery of the liner by braiding the first fiber bundles each of which comprises the large diameter fiber bundle unimpregnated with resin and the second fiber bundles each of which comprises a small diameter fiber bundle and the thermoplastic resin covering the small diameter fiber bundle with the braider (body forming step). Thereafter, the first fiber bundles are impregnated with the thermoplastic resin in the second fiber bundles which was heated and melted to be cured, thereby forming the outer shell made of fiber reinforced composite material (resin impregnating and curing step). Then, in the body forming step and/or the resin impregnating and curing step, the tension applied to the first fiber bundles is set to be larger than the tension applied to the second fiber bundle.

Accordingly, a looseness of the first fiber bundles comprising the large diameter fiber bundles can be removed. Thus, the small diameter fiber bundles in the second fiber bundles are tangled with the first fiber bundles, enabling the adjacent first fiber bundles to be bundled and be difficult to be separated. This would result in increasing the strength of the outer shell, and thereby increasing the strength of the pressure container. When impregnating the first fiber bundles (large diameter fiber bundles which are not impregnated with thermoplastic resin) are impregnated with the thermoplastic resin, a molding pressure to press the thermoplastic resin in the fiber bundles is needed, however, since the first fiber bundles and the small diameter fiber bundles in the second fiber bundles are crossed with each other with a tension applied thereto, the molding pressure which is needed can be applied.

According to the method of the first aspect of the present invention, after forming the body by braiding two kinds of fiber bundles (first and second fiber bundles), the thermoplastic resin in the second fiber bundles is melted, and the first fiber bundles are impregnated with the melted thermoplastic resin to be cured, thereby forming the outer shell made of fiber reinforced composite material. At this time, the tension applied to the first fiber bundles is set to be larger than that applied to the second fiber bundles, so that the looseness of the first fiber bundles can be removed, and the adjacent first fiber bundles can be bundled to be difficult to separate by tangling the small diameter fiber bundles in the second fiber bundles with the first fiber bundles. Consequently, the strength of the outer shell made of fiber reinforced composite material can be increased, and a pressure container with high strength can be obtained while utilizing the advantage of the braiding method (shortening of the manufacturing time and reduction of the manufacturing cost).

In accordance with a second aspect of the present invention, the pressure container manufacturing method for manufacturing a pressure container by forming an outer shell made of a fiber reinforced composite material on a periphery of a liner which comprises a cylindrical portion and curved dome portions provided on both ends of the cylindrical portion, comprises:

forming a body on a periphery of the liner by braiding a first fiber bundle and a second fiber bundle while orienting the first fiber bundle to incline at a predetermined angle to an axis direction of the cylindrical portion and orienting the second fiber bundle in an approximately circumferential direction of the liner;

impregnating the body with a resin; and curing the resin to form the outer shell.

According to the method of the second aspect of the present invention, the body is formed on the periphery of the liner by braiding the first fiber bundles and the second fiber bundle while orienting the first fiber bundles to incline at a predetermined angle to the axis direction of the cylindrical portion and orienting the second fiber bundle in an approximately circumferential direction of the liner, and the body is impregnated with resin to be cured, thereby forming the outer shell made of fiber reinforced composite material.

That is, when forming the body, unlike the earlier developed braiding method, not both of the orientation angles of the first and second fiber bundles are not inclined at a predetermined angle to the axis direction of the cylindrical portion. One of the two kinds of the fiber bundles is oriented to incline at a predetermined angle to the axis direction of the cylindrical portion, and the other thereof is oriented in the circumferential direction of the liner. Therefore, no problem would occur even when applying a different tension to each of the two kinds of the fiber bundles (first and second fiber bundles) which form the body.

Accordingly, since the tension applied to first fiber bundles can be larger than that applied to the second fiber bundle, a looseness of the first fiber bundles when forming the body (when braiding) can be prevented. The second fiber bundle is bent to tangle with the first fiber bundles, so that the first fiber bundles can be bundled to be difficult to separate. This would result in increasing the strength of the outer shell, and thereby increasing the strength of the pressure container.

Further, according to the method of the second aspect of the present invention, the first fiber bundles are oriented to incline at a predetermined angle to the axis direction of the cylindrical portion and the second fiber bundle is oriented in an approximately circumferential direction of the liner, so that no problem would occur even when the diameters of two kinds of fiber bundles are different from each other. Accordingly, since the diameter of the first fiber bundle can be set to be larger than that of the second fiber bundle while preventing the looseness of the first fiber bundles as described above, the strength of the outer shell can be increased.

Since the strength of the outer shell can be increased as described above by preventing the looseness of the fiber bundles as described above, there is no need to increase the fiber bundles to keep the strength of the outer shell. Accordingly, the pressure container can be light in weight, and the manufacturing cost can be suppressed.

Further, according to the method of the second aspect of the present invention, the body is formed on the periphery of the liner by braiding the first fiber bundles and the second fiber bundle while orienting the first fiber bundles to incline at a predetermined angle to the axis direction of the cylindrical portion and orienting the second fiber bundle in an approximately circumferential direction of the liner, so that the looseness of the fiber bundles in the body can be prevented. The body is impregnated with resin to be cured, thereby forming the outer shell with high strength. This results in obtaining a pressure container which has high strength and is light in weight while suppressing the manufacturing cost.

Preferably, in the method of the second aspect of the present invention, a tension applied to the first fiber bundle is larger than a tension applied to the second fiber bundle.

Preferably, in the method of the second aspect of the present invention, a diameter of the first fiber bundle is larger than a diameter of the second fiber bundle.

BRIEF DESCRIPTION OF THE DRAWINGS

The present invention will become more fully understood from the detailed description given hereinafter and the accompanying drawings which are given by way of illustration only, and thus are not intended as a definition of the limits of the present invention, and wherein.

DETAILED DESCRIPTION OF THE PREFERRED EMBODIMENTS

First Embodiment

Figure 1:
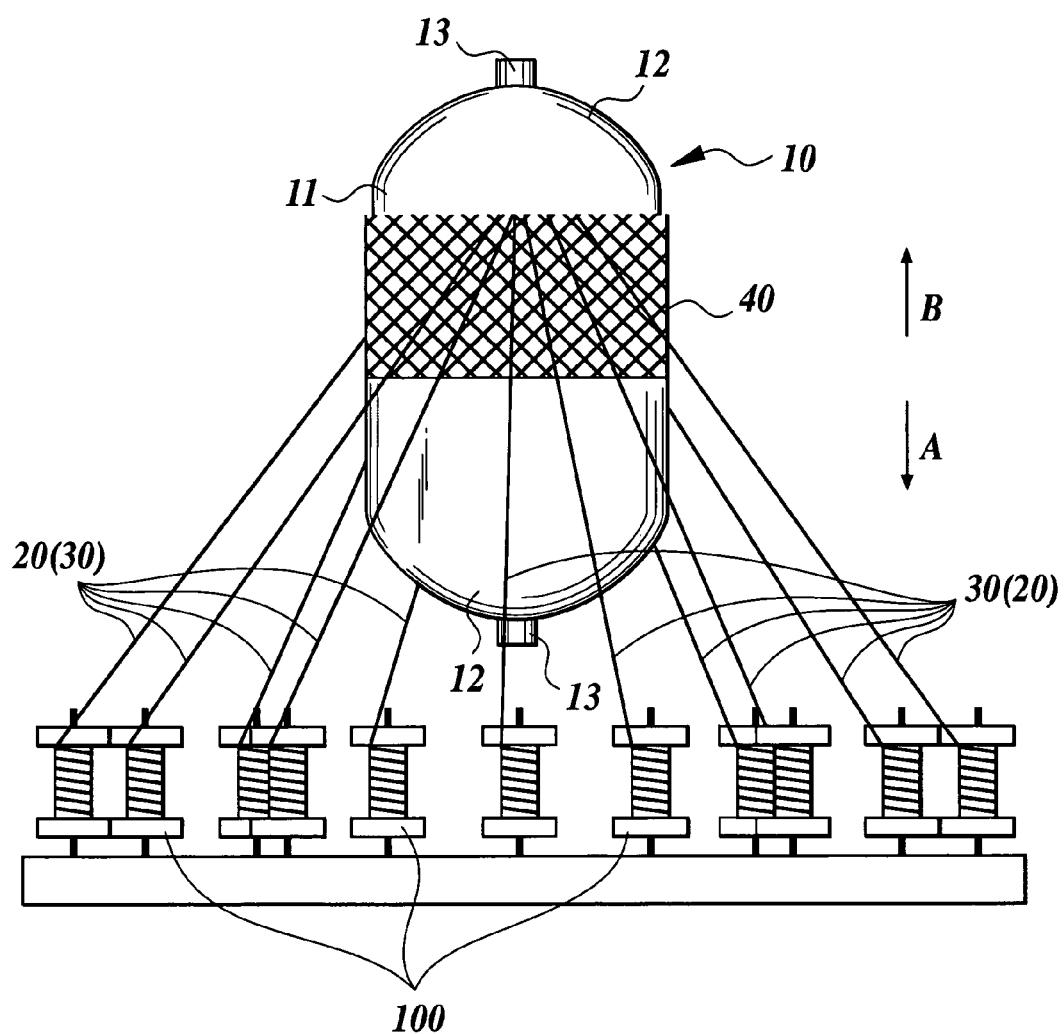
FIG. 1 is an explanation view for explaining a body forming step of a pressure container manufacturing method according to the first embodiment in the present invention.

The first embodiment of the present invention will be explained below referring to the drawings.

In this embodiment, the explanation will be made on a method to manufacture a CNG tank by forming an outer shell made of fiber reinforced composite material on the periphery of the liner 10 (refer to FIG. 1). The tank manufactured by the method according to this embodiment is a pressure container which can be filled with several hundred of atmospheres of CNG.

First, the liner 10 is molded by a material which is excellent in gas barrier property (liner molding step). In the embodiment, the liner 10 is molded by a blow molding method using liquid crystal resin which is excellent in dimensional stability and chemical resistance as well as gas barrier property. The liner 10, as shown in FIG. 1, comprises a cylindrical portion 11 and dome portions 12 formed at both ends of the cylindrical portion 11. A metal mouth piece 13 is attached to the top of each dome portion 12.

Next, first fiber bundles 20 comprising only large diameter carbon fiber bundles (large diameter fiber bundles) and second fiber bundles 30 each formed by covering a small diameter carbon fiber bundle (a small diameter fiber bundle) with many fibrous thermoplastic resins are prepared (fiber bundle preparing step).

Figure 2A:
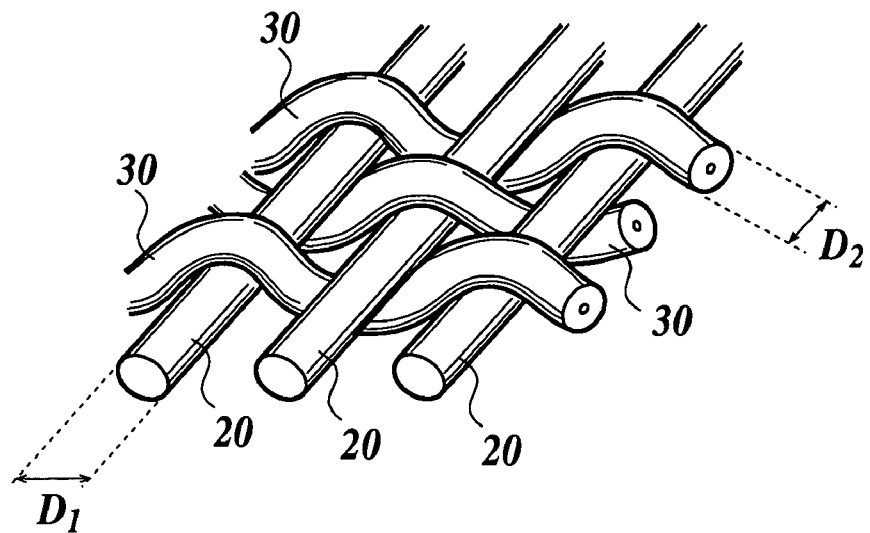
FIG. 2A is a partially expanded view of a body formed by braiding first fiber bundles and second fiber bundles used in the pressure container manufacturing method according to the first embodiment.
Figure 2B:
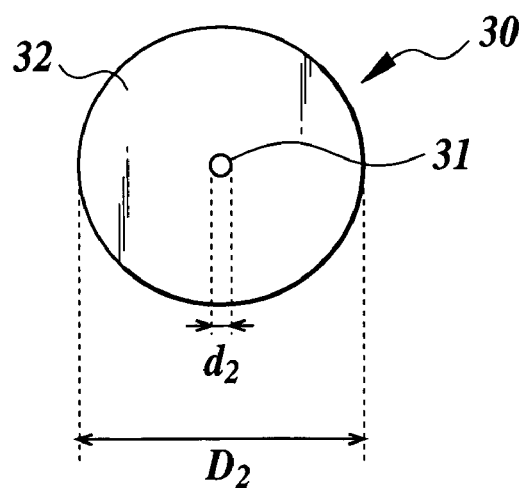
FIG. 2B is an expanded sectional view of the second fiber bundles forming the body shown in FIG. 2A in a radial direction thereof.

In the embodiment, about 120,000 carbon fibers are bundled to prepare the first fiber bundle 20 with a diameter of $D_1$ (refer to FIG. 2A), and a carbon fiber bundle 31 with a diameter of $d_2$ formed by bundling about 1,000 carbon fibers is covered with a fibrous thermoplastic resin 32 to prepare the second fiber bundle 30 with a diameter of $D_2$ (refer to FIG. 2B).

In the embodiment, the diameters $D_1$ and $D_2$ of the first and second fiber bundles 20 and 30 are set to be approximately the same, and the ratio of the diameter $D_1$ of the first fiber bundle 20 which is a large diameter carbon fiber bundle to the diameter $d_2$ of the small diameter carbon fiber bundle 31 in the second fiber bundle 30 ($D_1:d_2$) is set to be 12:1. Polyimide, polyphenylene sulfite, polyethylene terephthalate or the like is applied as the thermoplastic resin 32 forming the second fiber bundle 30. Each of the first and second fiber bundles 20 and 30 is wound around bobbins 100 (refer to FIG. 1) of the braider arranged around the liner 10 to be used in a body forming step to be described later.

Next, the first and second fiber bundles 20 and 30 are continuously provided from the bobbins 100 of the braider arranged around the liner 10 while reciprocating the liner 10 in an axis direction (directions of arrows A and B) as shown in FIG. 1 to braid them, thereby forming a body 40 on the periphery of the liner 10 (body forming step). FIG. 2A shows a partially expanded view of the body 40, and FIG. 2B shows an expanded sectional view of the second fiber bundle 30 forming the body 40.

The procedure of the body forming step will be specifically explained. First, the first and second fiber bundles 20 and 30 are provided from the plurality of bobbins 100 arranged along a circumferential direction of the cylindrical portion 11 of the liner 10, and end portions of the fiber bundles are attached near the middle portion of the cylindrical portion 11 of the liner 10 in the axis direction. At this time, the thermoplastic resins of the end portions of the second fiber bundles 30 are heated and melted to develop adhesiveness, and the end portions of the first fiber bundles 20 are overlapped with the end portions of the second fiber bundles 30 having the adhesiveness to attach the first fiber bundles 20 together with the second fiber bundles 30.

Thereafter, the first and second fiber bundles 20 and 30 are continuously provided from the bobbins 100 while moving the liner 10 in the axis direction (direction of the arrow A) to braid them, so that the body 40 is formed on the outside of the cylindrical portion 11 and the dome portions 12. Then, when the body 40 is formed to the root portion of the mouth piece 13 of the liner 10, the liner 10 is stopped and each bobbin 100 is rotated approximately a half-turn in the circumferential direction of the liner 10.

After arranging each bobbin 100 at a position which is approximately opposite to the position before the rotation across the mouth piece 13 by rotating each bobbin 100 approximately a half-turn in the circumferential direction of the liner 10 as described above, formation of the body 40 is continued while moving the liner 10 in the opposite direction (direction of the arrow B). By repeating the above procedures, the body 40 with a predetermined thickness is formed on the whole outside of the cylindrical portion 11 and the dome portions 12 of the liner 10.

Figure 3:
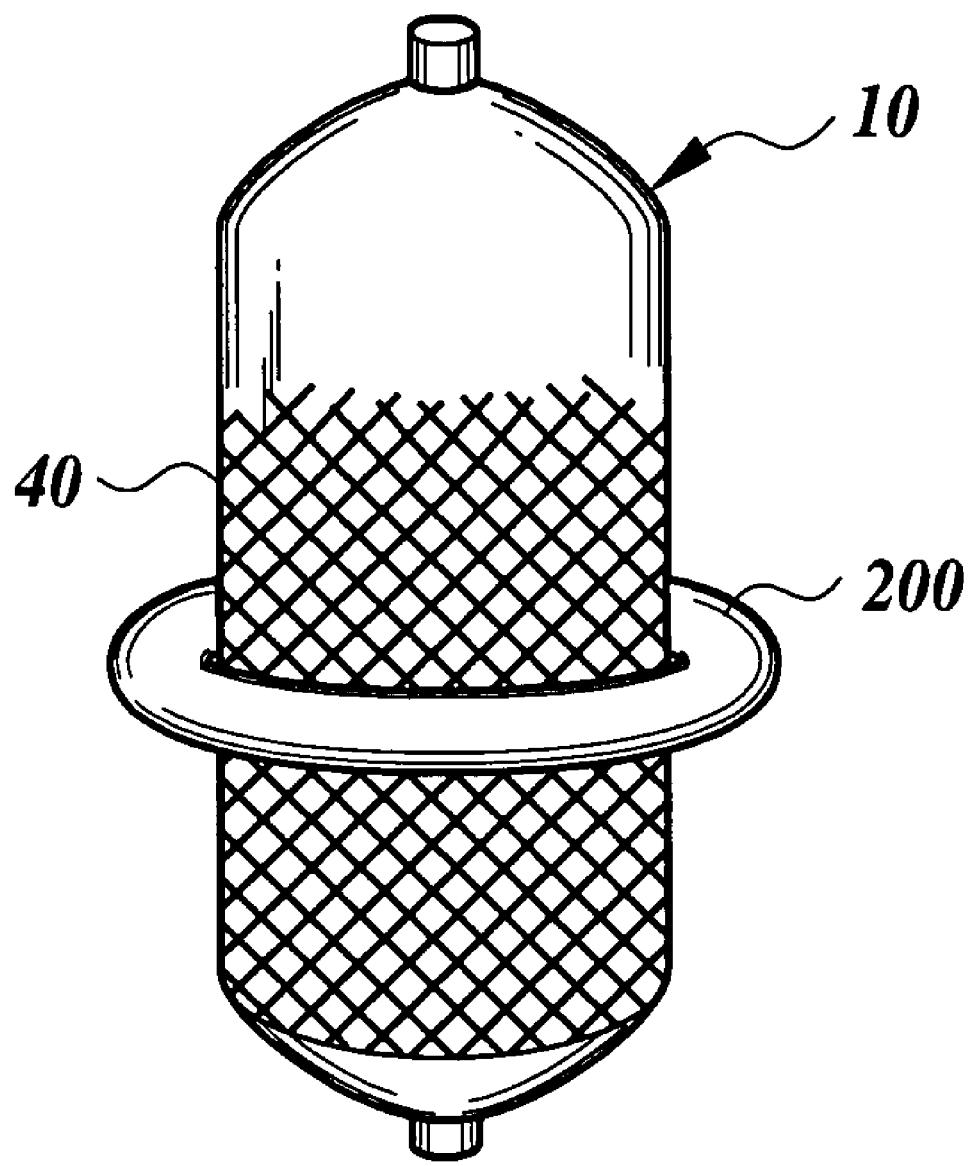
FIG. 3 is an explanation view for explaining a resin impregnating and curing step of the pressure container manufacturing method according to the first embodiment in the present invention.
Figure 4A:
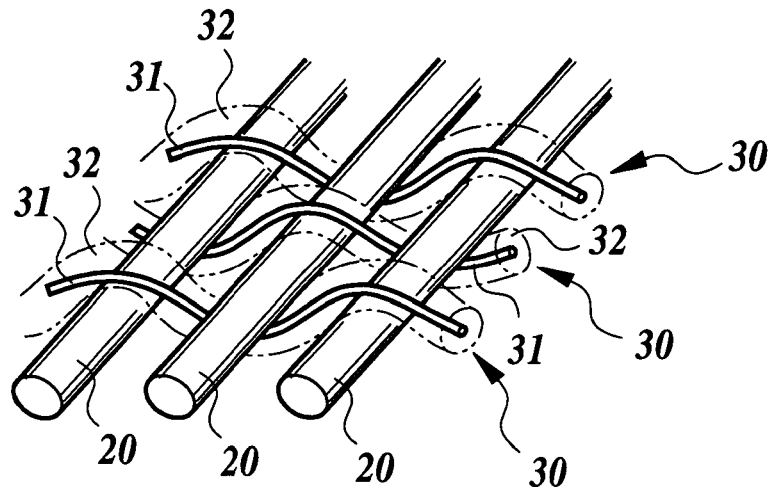
FIG. 4A is an explanation view showing a state where thermoplastic resin of the second fiber bundles of the body shown in FIG. 2A is melted.

An annular heater 200 (refer to FIG. 3) arranged around the liner 10 is used to heat the body 40 at the time of forming the body 40 in the body forming step, so that the thermoplastic resins 32 of the second fiber bundles 30 are melted as shown in FIG. 4A to be impregnated into the first fiber bundles 20. Thereafter, the thermoplastic resins 32 are cured by natural cooling to form an outer shell made of fiber reinforced composite material (resin impregnating and curing step).

Figure 4B:
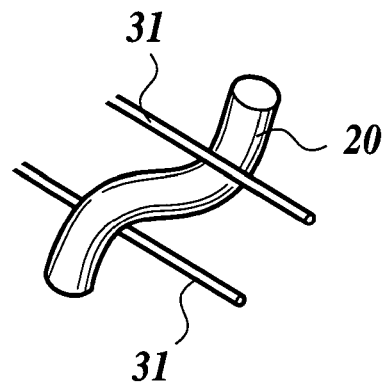
FIG. 4B is an explanation view showing a state where the first fiber bundle of the body shown in FIG. 4A is bent.

When the first fiber bundles 20 are not applied with enough tension in the resin impregnating and curing step, the first fiber bundles 20 are bent as shown in FIG. 4B. Thus, in this embodiment, tension adjusting sections (not shown) provided at the bobbins 100 of the braider are used to apply enough tension to the first fiber bundles 20, thereby removing the bend (looseness) of the first fiber bundles 20.

In the embodiment, the tension adjusting sections (not shown) provided at the bobbins 100 of the braider are used to set the tension applied to the second fiber bundles 30 smaller than that applied to the first fiber bundles 20. Setting the tension in this way is successful in tangling the small diameter carbon fiber bundles 31 in the second fiber bundles 30 with the first fiber bundles 20 (refer to FIGS. 4A and 4C).

A CNG tank as a pressure container can be obtained by performing the above steps. The outer shell made of fiber reinforced composite material of the obtained CNG tank is formed by winding the first fiber bundles 20 which are large diameter carbon fiber bundles in approximately the same direction, so that the outer shell can obtain high strength like an outer shell formed by the FW method.

In the manufacturing method according to the first embodiment explained above, the first fiber bundles 20 comprising only large diameter carbon fiber bundles which are not impregnated with resin and the second fiber bundles 30 each of which is formed by covering the small diameter carbon fiber bundle 31 with the thermoplastic resin 32 are braided by using the braider to form the body 40 on the periphery of the liner 10 (refer to FIG. 1). Then, the thermoplastic resins, 32 of the second fiber bundles 30 are heated and melted (refer to FIGS. 3 and 4A), impregnating the melted thermoplastic resins 32 into the first fiber bundles 20 and curing them, and thereby the outer shell made of fiber reinforced composite material is formed. At this time, the tension applied to the first fiber bundles 20 is set to be larger than that applied to the second fiber bundles 30.

Figure 4C:
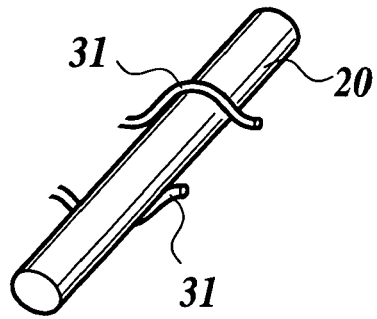
FIG. 4C is an explanation view showing a state where a tension is applied to the first fiber bundle of the body shown in FIG. 4A.

Accordingly, the looseness of the first fiber bundle 20 comprising only the large diameter carbon fiber bundle can be removed (refer to FIGS. 4A and 4C). The small diameter carbon fiber bundles 31 of the second fiber bundles 30 are tangled with the first fiber bundles 20. This enables the adjacent first fiber bundles 20 to be bundled and be difficult to be separated (refer to FIGS. 4A and 4C). Thus, the strength of the outer shell made of resin reinforced composite material can be increased, thereby increasing the strength of the CNG tank. Each second fiber bundle 30 comprises not only the thermoplastic resin 32 but also the carbon fiber bundle 31, so that the second fiber bundles 30 would not be cut when tension is applied thereto in the body forming step or the resin impregnating and curing step.

In the above first embodiment, the example was made where liquid crystal resin is used to prepare the liner 10, however, the material to form the liner 10 is not limited to liquid crystal resin. For example, other synthetic resin having gas barrier property such as high-density polyethylene or the like, or metallic material such as aluminum base alloy or the like is also used to prepare the liner 10. In the above first embodiment, the example was made where the liner 10 is molded by the blow molding method, however, the liner 10 may be molded by adopting an injection molding method or the like.

In the manufacturing method according to the first embodiment, the example was made where the ratio of the diameter $D_1$ of the first fiber bundle 20 which is a large diameter carbon fiber bundle to the diameter $d_2$ of the small diameter carbon fiber bundle 31 in the second fiber bundle 30 (diameter ratio $D_1:d_2$) is set to be 12:1, however, the diameter ratio may be appropriately changed. For example, for increasing the strength of the outer shell of the CNG tank, the diameter of the first fiber bundles 20 may be relatively increased, and the diameter ratio $D_1:d_2$ may be set to be about 24:1.

In the manufacturing method according to the first embodiment, the example was made where the first and second fiber bundles 20 and 30 are prepared by using carbon fibers, however, they may be prepared by using other reinforce fibers such as glass fibers, aramid fibers or the like. The outer portion of the carbon fibers forming the first fiber bundles 20 or the second fiber bundles 30 may be protected by covering them with glass fibers or the like.

Second Embodiment

The second embodiment of the present invention will be explained below referring to the drawings. The component that is same as in the first embodiment will be given the same reference numeral and the explanations thereof will be omitted. The tank manufactured by the manufacturing method according to this embodiment is a pressure container which can be filled with about 200 atmospheres of CNG.

First, the liner 10 is prepared with a material which is excellent in gas barrier property (liner preparing step).

Next, first fiber bundles 120 each comprising a large diameter carbon fiber bundle (large diameter fiber bundle) and a second fiber bundle 130 comprising a small diameter carbon fiber bundle (small diameter fiber bundle) are prepared (fiber bundle preparing step).

Figure 8A:
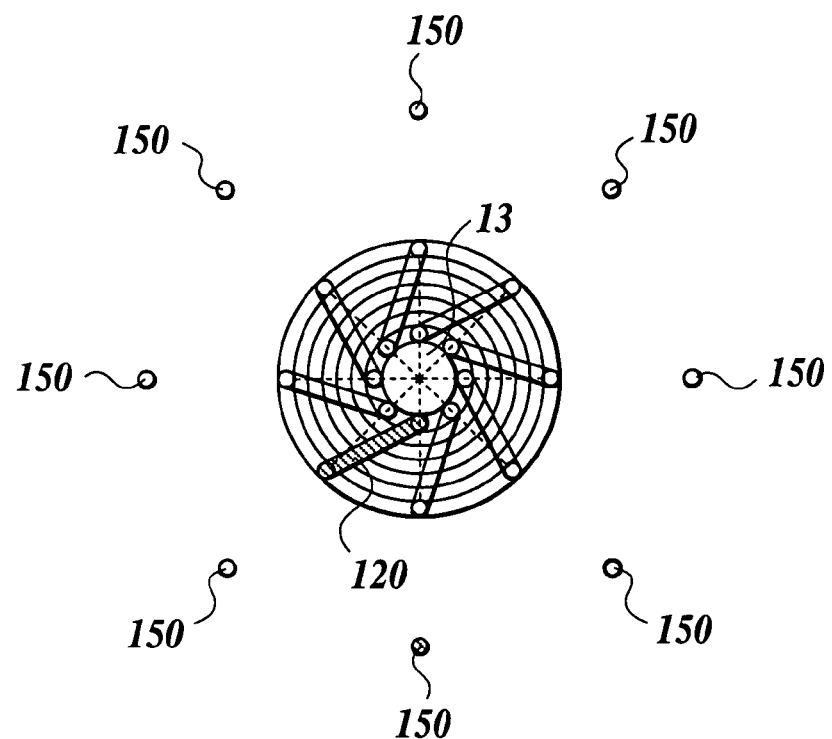
FIGS. 8A and 8B are explanation views for explaining an orientation state of first fiber bundles when reversing the moving direction of a liner in the body forming step of the pressure container manufacturing method according to the second embodiment in the present invention.

In the embodiment, about 120,000 carbon fibers are bundled to prepare the first fiber bundle 120, and about 1,000 carbon fibers are bundled to prepare the second fiber bundle 130. The first fiber bundles 120 are wound around first bobbins 150 of the braider (refer to FIGS. 8A and 8B), and the second fiber bundle 130 is wound around a second bobbin (not shown) of the braider, respectively, to be used in a body forming step to be described later.

Figure 5:
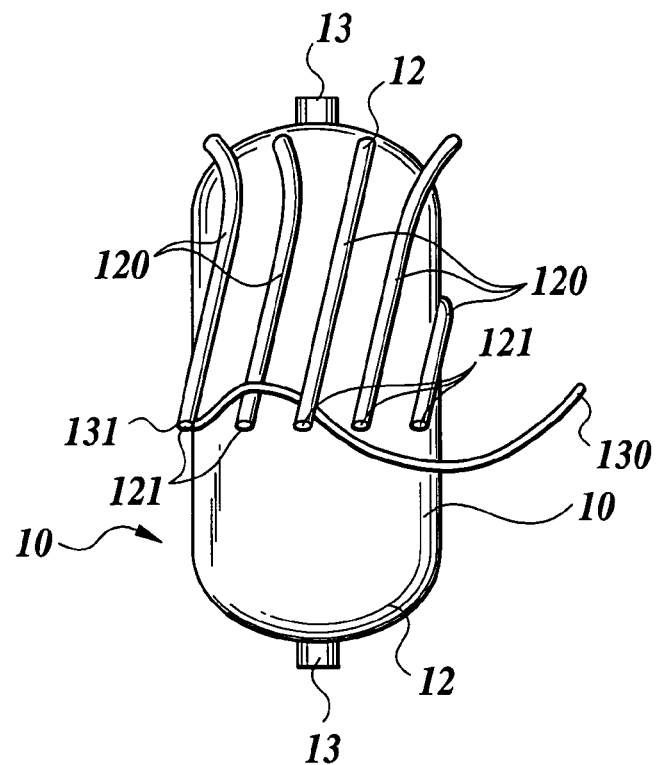
FIG. 5 is an explanation view for explaining a fiber bundle attaching step of a pressure container manufacturing method according to the second embodiment in the present invention.

Next, the first fiber bundles 120 are provided from the first bobbins 150 (refer to FIG. 8A) arranged along a circumferential direction of the cylindrical portion 11 of the liner 10, and end portions 121 of the first fiber bundles 120 are attached near the middle portion of the cylindrical portion 11 of the liner 10 in the axis direction. Also, one second fiber bundle 130 is provided from the second bobbin, and an end portion 131 of the second fiber bundle 130 is attached near the middle portion of the cylindrical portion 11 of the liner 10 in the axis direction as shown in FIG. 5 (fiber bundle attaching step).

In the fiber bundle preparing step, each end of the carbon fiber bundles is impregnated with thermoplastic resin which was heated and melted, and the portion which was impregnated with resin is attached to the cylindrical portion 11 of the liner 10.

Figure 6:
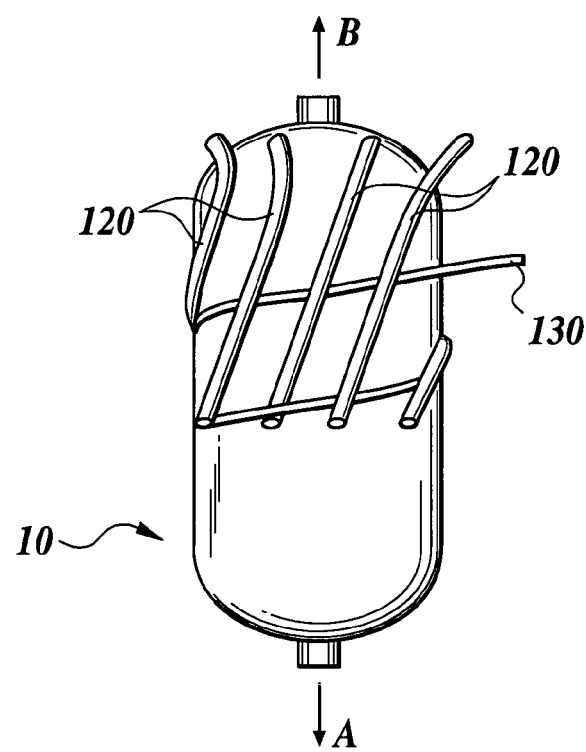
FIG. 6 is an explanation view for explaining a body forming step of the pressure container manufacturing method according to the second embodiment in the present invention.

Next, the liner 10 is slowly rotated in the circumferential direction while moving it in the axis direction (direction of an arrow A) as shown in FIG. 6. The first fiber bundles 120 are continuously provided from the first bobbins 150, and the second fiber bundle 130 is provided from the second bobbin to braid them, thereby forming a body 140 (refer to FIG. 7B) on the periphery of the cylindrical portion 11 and the dome portions 12 of the liner 10 (body forming step).

Figure 7A:
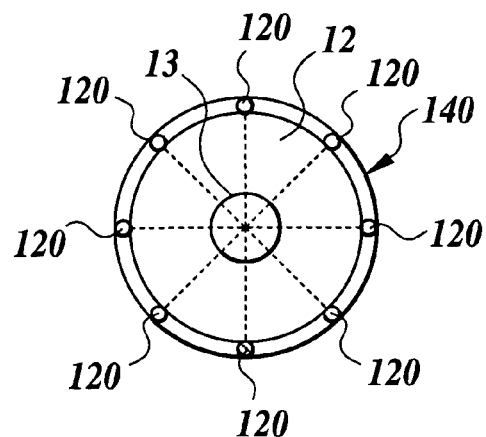
FIGS. 7A to 7D are explanation views for explaining the body forming step of the pressure container manufacturing method according to the second embodiment in the present invention.
Figure 7C:
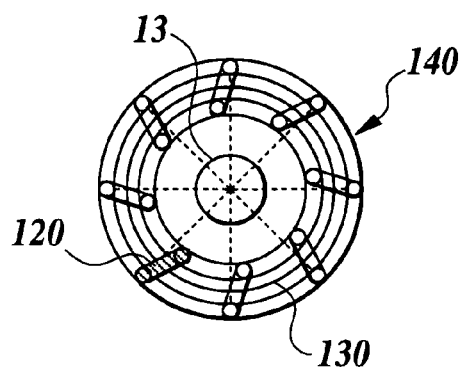
Figure 7B:
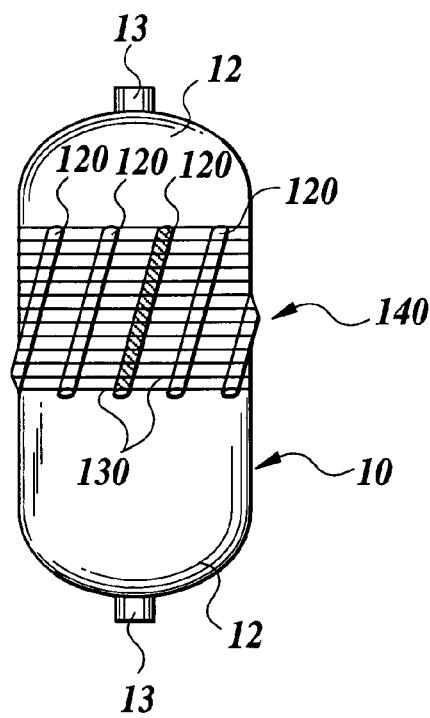
Figure 7D:
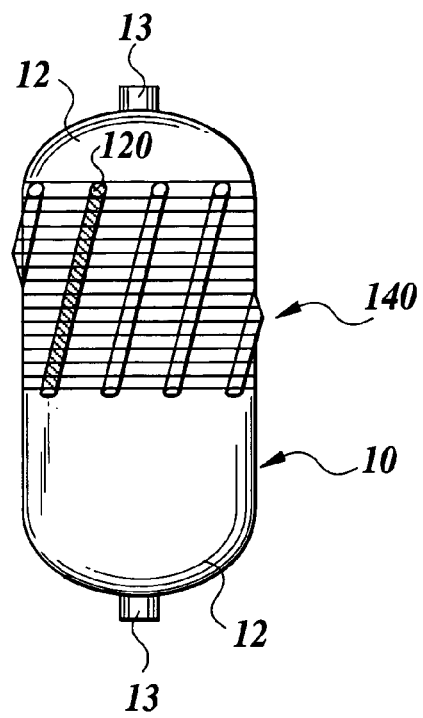

In the body forming step, the liner 10 is slowly rotated in the circumferential direction, so that the first fiber bundles 120 are inclined at a predetermined angle to the axis direction of the cylindrical portion 11 of the liner 10 (refer to FIGS. 6 and 7B). The angle of the first fiber bundles 120 to the axis direction of the cylindrical portion 11 (orientation angle) is set corresponding to the ratio of the diameter of the cylindrical portion 11 to that of the mouth piece 13 (diameter ratio). For example, when the diameter ratio is 5:1, the orientation angle is set to be about 20°. The second fiber bundle 130 is oriented in the circumferential direction of the liner 10 (refer to FIG. 6 and FIG. 7B).

In the body forming step, tension adjusting sections (not shown) provided at the first bobbins 150 and the second bobbin of the braider are used to apply enough tension to the first and second fiber bundles 120 and 130. In this embodiment, the tension applied to the first fiber bundles 120 is set to be relatively large, so that the looseness of the first fiber bundles 120 can be removed.

Figure 8B:
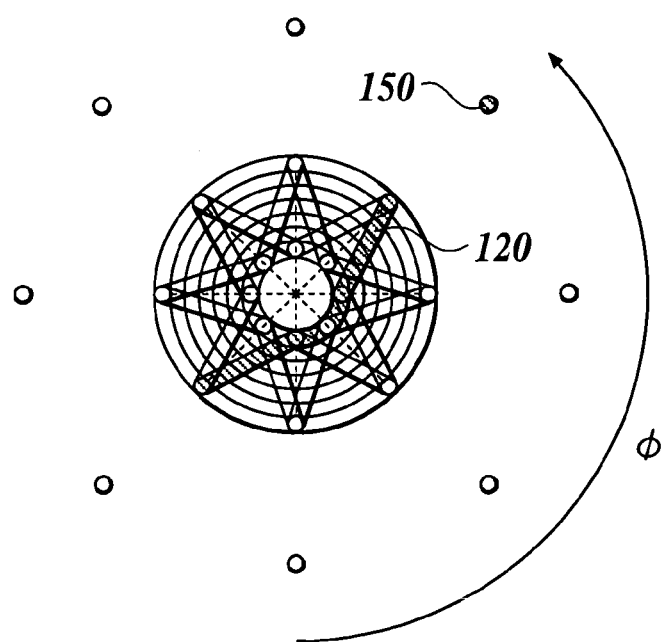

In the body forming step, when the body 140 is formed to the root portion of the mouth piece 13 of the liner 10, the liner 10 is stopped and each first bobbin 150 is rotated φ° in the circumferential direction of the liner 10 as shown in FIG. 8B. Thereafter, formation of the body 140 is continued while moving the liner 10 in the opposite direction (direction of the arrow B: refer to FIG. 6).

The value φ° is set in a range of about 135° to about 180°. Before reversing the moving direction of the liner 10 from the direction of the arrow A to the direction of the arrow B, the first bobbins 150 are rotated φ° in the circumferential direction of the liner 10, so that it can be prevented that the first fiber bundles 120 are oriented in the state of being folded in the opposite direction. That is, as shown in FIG. 8B, the first fiber bundles 120 can be oriented to be wound around the dome portions 12.

In the above body forming step, the body 140 with a predetermined thickness is formed on the outside of the cylindrical portion 11 and the dome portions 12 of the liner 10. When the formation of the body 140 is finished, the second fiber bundle 130 is cut.

Figure 9:
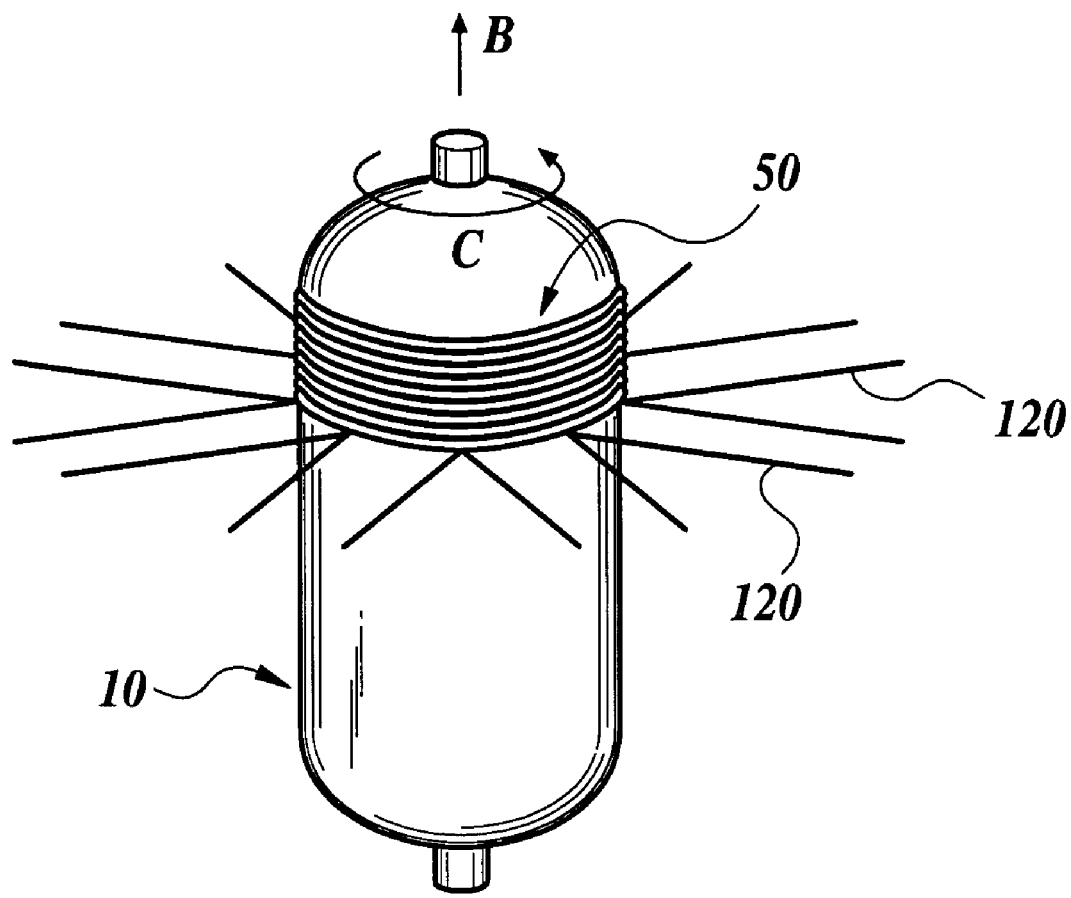
FIG. 9 is an explanation view for explaining a fiber bundle winding layer of the pressure container manufacturing method according to the second embodiment in the present invention.

Next, the liner 10 is moved in the axis direction (direction of the arrow B) while rotating it in the circumferential direction (direction of an arrow C) as shown in FIG. 9, so that the first fiber bundles 120 are wound around the cylindrical portion 11 and the dome portions 12 of the liner 10, thereby forming a fiber bundle winding layer 50 (winding layer forming step) with a predetermined thickness on the body 140. Then, end portions of the first fiber bundles 120 are fixed by the same method as that in the fiber bundle attaching step.

Next, the winding layer 50 of the body 140 is impregnated with thermoplastic resin which was heated and melted. Thereafter, the impregnated thermoplastic resin is cured by natural cooling to form an outer shell made of fiber reinforced composite material (resin impregnating and curing step). A CNG tank as a pressure container can be obtained by performing the above steps.

In the manufacturing method according to the second embodiment, the body 140 is formed on the outside of the liner 10 while orienting the second fiber bundle 130 in an approximately circumferential direction of the liner 10 as well as orienting the first fiber bundles 120 to incline at a predetermined angle to the axis direction of the cylindrical portion 11 of the liner 10, and this body 140 is impregnated with thermoplastic resin to be cured, thereby forming the outer shell made of fiber reinforced composite material.

That is, one of the two kinds of the carbon fiber bundles is oriented to incline at a predetermined angle to the axis direction of the liner 10, and the other thereof is oriented in an approximately circumferential direction of the liner 10, so that no problem would occur even when applying a different tension to each of the two kinds of the carbon fibers which form the body 140.

Accordingly, since the tension applied to the first fiber bundles 120 can be set to be larger than that applied to the second fiber bundle 130, the looseness of the first fiber bundles 120 can be prevented when forming a body (when braiding). Thus, the strength of the outer shell made of resin reinforced composite material can be increased, thereby increasing the strength of the CNG tank.

In the manufacturing method according to the second embodiment, the diameter of one of the two kinds of the carbon fiber bundles which is oriented to incline at a predetermined angle to the axis direction of the liner 10 is set to be larger than that of the other thereof which is oriented in an approximately circumferential direction of the liner 10, so that the strength of the outer shell can be increased. As described above, since the strength of the outer shell can be increased by preventing the looseness of the first fiber bundles 120, there is no need to increase fiber bundles to keep the strength of the outer shell. Accordingly, the CNG tank can be light in weight, and the manufacturing cost can be suppressed.

In the manufacturing method according to the second embodiment, the example was made where the ratio of the diameter of the first fiber bundle 120 to the diameter of the second fiber bundle 130 (diameter ratio) is set to be about 12:1, however, the diameter ratio may be appropriately changed. For example, for increasing the strength of the outer shell of the CNG tank, the diameter of the first fiber bundles 120 may be relatively increased, and the diameter ratio may be set to be about 24:1.

In the manufacturing method according to the second embodiment, the example was made where the body 140 and the winding layer 50 are impregnated with "thermoplastic resin" to be cured in the resin impregnating and curing step, however, "thermosetting resin" may be used instead of "thermoplastic resin".

In the manufacturing method according to the second embodiment, the example was made where the first and second fiber bundles 120 and 130 are prepared by using "carbon fibers", however, they may be prepared by using "glass fibers" or "aramid fibers".

The entire disclosure of Japanese Patent Application Nos. Tokugan 2003-342937 which was filed on Oct. 1, 2003, and Tokugan 2003-346156 which was filed on Oct. 3, 2003, including specification, claims, drawings and summary are incorporated herein by reference in its entirety.

What is claimed is:

1. A pressure container manufacturing method for manufacturing a pressure container by forming an outer shell made of a fiber reinforced composite material on a periphery of a liner, comprising:
    preparing a first fiber bundle, and a second fiber bundle;
    wherein a diameter of said first diameter fiber bundle is larger than that of said second diameter fiber bundle; and
    wherein the first fiber bundle is unimpregnated with a resin and the second fiber bundle is covered with a thermoplastic resin to form an impregnated second fiber bundle;
    forming a body on the periphery of the liner by braiding the first fiber bundle and the impregnated second fiber bundle with a braider;
    impregnating the first fiber bundle with the thermoplastic resin in the second fiber bundle which is heated and melted; and
    curing the thermoplastic resin to form the outer shell,
    wherein a tension applied to the first fiber bundle is larger than a tension applied to the impregnated second fiber bundle when forming the body and/or impregnating the thermoplastic resin onto the first fiber bundle.

2. The method as claimed in claim 1, wherein the liner comprises a cylindrical portion, dome portions provided on both ends of the cylindrical portion and a mouth piece attached to a top portion of at least one of the dome portions, and when the body is formed to a root portion of the mouth piece of the liner, a movement of the liner is stopped, and a formation of the body is continued while moving the liner in a direction opposite to the mouth piece along an axis direction of the liner after rotating bobbins which provide the first fiber bundle and the second fiber bundle approximately a half-turn in a circumferential direction of the liner, in the forming of the body.

3. The method as claimed in claim 1, wherein the thermoplastic resin is any one of a polyimide, a polyphenylene sulfite and a polyethylene terephthalate.

4. The method as claimed in claim 1, wherein the thermoplastic resin is heated to melt by an annular heater arranged around the liner.

5. The method as claimed in claim 1, wherein the liner comprises any one of a liquid crystal resin, a synthetic resin and a metallic material.

6. The method as claimed in claim 1, wherein the first fiber bundle and the second fiber bundle comprise any one of a carbon fiber, a glass fiber and an aramid fiber.

7. The method as claimed in claim 1, wherein the diameter of the first fiber bundle and the diameter of the impregnated second fiber bundle are set to be approximately the same.

* * * * *